United States Patent
Lavin et al.

[11] Patent Number: 5,923,563
[45] Date of Patent: Jul. 13, 1999

[54] VARIABLE DENSITY FILL SHAPE GENERATION

[75] Inventors: Mark A. Lavin, Katonah, N.Y.; William C. Leipold, Essex Junction, Vt.

[73] Assignee: International Business Machines Corporation, Armonk, N.Y.

[21] Appl. No.: 08/770,925

[22] Filed: Dec. 20, 1996

[51] Int. Cl.[6] .................................................. G06F 17/50
[52] U.S. Cl. .................. 364/488; 364/489; 364/490; 364/491; 364/578
[58] Field of Search ................................ 364/488, 489, 364/490, 491, 578

[56] References Cited

U.S. PATENT DOCUMENTS

| | | | |
|---|---|---|---|
| 5,278,105 | 1/1994 | Eden et al. | 364/488 |
| 5,341,310 | 8/1994 | Gould et al. | 364/491 |
| 5,552,996 | 9/1996 | Hoffman et al. | 364/468.28 |
| 5,636,133 | 6/1997 | Chesebro et al. | 364/491 |

*Primary Examiner*—Kevin J. Teska
*Assistant Examiner*—Thuan Do
*Attorney, Agent, or Firm*—Howard J. Walter, Jr.

[57] ABSTRACT

The present invention is directed to a method for adding fill shapes to a chip in a manner which accommodates a wide range of within-chip pattern density variations and provides a tight pattern density control (i) within a chip and (ii) from chip to chip. The present invention imposes a grid over a chip design pattern, wherein each section of the grid contains a portion of the chip design. A pattern density is then determined for each section of the grid, based on that portion of the chip design pattern which lies within the particular grid section. The results of the pattern density determination are used to determine where to place fill shapes in the chip design in order to increase a density value in each section of the grid to that of a target density value. The method and apparatus of the present invention provide a best fit approximation to the desired pattern density consistent with a set of layout rules for the level being patterned.

27 Claims, 5 Drawing Sheets

| FILL_FRAC | FILL PATTERN |
|---|---|
| > 0.75 | DENSE |
| 0.25-0.75 | MEDIUM |
| < 0.25 | LOW |

FIG. 7

VARIABLE DENSITY FILL SHAPE GENERATION

CROSS-REFERENCE TO RELATED APPLICATIONS

The subject matter of this application is related to application Ser. No. 08/444,471 for "Efficient Generation Of Negative Fill Shapes For Chips And Packages" by Liebmann and Lavin, filed on May 19, 1995, application Ser. No. 08/445,447 for "Efficient Generation Of Fill Shapes For Chips And Packages" by Chesebro, Kim, Maynard, and Lavin, filed on May 19, 1995, and application Ser. No. 08/487,814 for "Method And Apparatus For Selective Shape Adjustment Of Hierarchical Designs" by Leipold, filed on Jun. 7, 1995, all assigned to a common assignee with this application. The foregoing applications are incorporated herein by reference.

BACKGROUND OF THE INVENTION

1. Field of the Invention

The present invention relates generally to the design of semiconductor integrated circuits (ICs) or of electronic packages and, more particularly, to an efficient procedure for adding fill shapes to the design to correct for process deviations.

2. Description of the Prior Art

Semiconductor integrated circuits (ICs) and printed circuit packages are typically composed of layered structures. The layered structures may include several layers of conducting, insulating and/or combinations of other materials. The layers typically are structured in a horizontal dimension by fabrication processes, wherein the fabrication processes are used to transfer patterns defined in physical designs or layouts to the actual physical layers. The physical designs may be represented by computer data corresponding to two-dimensional shapes. The computer data may also be organized in a hierarchical data structure for exploiting the repetitive structure usually found in circuits and packages.

In some instances, the action of a fabrication process is affected by the specific design patterns being transferred to a layer of physical material. For example, a local pattern density of a design, i.e., the fraction of area over which material is deposited (or removed), can affect the shapes and dimensions of features being patterned in a particular layer. The amount and extent of the affected shapes and dimensions of features within a given area i.e., the "locality extent," is also dependent on the specific fabrication process being used. As a specific example, in a reactive ion etching (RIE) process step, a deficiency in a local pattern density may occur in which a surplus of material is to be etched away. The etching deficiency thus causes the pattern features to be too large (i.e., "under etched") wherein the deficiency occurred due to a depletion of the etchants during the etching process step. This surplus effect can appear to act at on a length scale of one hundred micrometers to millimeters (i.e. 0.1 to 1 mm). Other processes that may be adversely affected by local pattern density include lithographic patterning of resist materials and chemical-mechanical (so called "chem-mech") polishing (CMP).

There have been a variety of approaches to solving the above problem, some of which pertain to the fabrication process itself. Other solutions have included modifying the physical design to mitigate the pattern-dependent effects. The approach of the latter type solution is to reduce deviations from design to fabricated part. Such a reduction in the deviations is accomplished by adding fill shapes that have no electrical function but which reduce variations in a local pattern density. There are several drawbacks to this latter approach, however, including the possibility that the fill shapes may affect an electrical behavior/performance of the resultant device. The fill shapes are also difficult to add to a design manually and may be computationally costly to generate automatically. Furthermore, the fill shapes may significantly increase a data size of a physical design, thereby making subsequent data-handling steps (e.g., mask fracturing) more difficult.

In U.S. Pat. No. 5,278,105 entitled "Semiconductor Device With Dummy Features In Active Layers" to Eden et al., the use of fill shapes for correcting process problems due to local pattern density deficiencies is described. Briefly, Eden teaches a method of adding fill shapes to each active layer of a semiconductor device. A "virtual layer" is created by recording all active areas of an active layer. A guard band of a specified width is drawn around the active areas. A further guard band is drawn around all active regions of all layers to prevent line to line and interlayer parasitic capacitance. This procedure is repeated with all active layers, adding active regions and guard bands to the virtual layer for each layer. A blocking layer is also added to the virtual layer to block out user defined regions where fill shapes can not be added. Ultimately, the virtual layer defines the regions where fill shapes can not be added. Fill shapes are added outside of these regions for each active layer.

Eden, however, does not teach a method of generating any specific fill shapes. Nor does Eden disclose any suitable criteria of where to strategically add specific fill shapes in a design. Furthermore, as currently practiced in the industry, fill shapes are added based on the average pattern density for an entire chip. While this helps to lower the variations in pattern density within a chip and from chip to chip, it can not fully accommodate the wide range of within-chip pattern density variation. Furthermore, adding fill shapes based on an average pattern density of the entire chip is too coarse-grained to provide a tight pattern density control from chip to chip.

Consequently, it would be desirable to have a method for calculating a fill pattern and generating fill shapes for a design, and further for achieving a particular target density value for a chip or a specific area of a chip.

SUMMARY OF THE INVENTION

Accordingly, the present invention is directed to a method for adding fill shapes to a chip in a manner which accommodates a wide range of within-chip pattern density variations and provides a tight pattern density control (i) within a chip and (ii) from chip to chip.

The present invention includes the step of first imposing a grid over a chip design pattern, wherein each section of the grid contains a portion of the chip design. A pattern density is then determined for each section of the grid, based on that portion of the chip design pattern which lies within the particular grid section. The results of the pattern density determination are used to determine in accordance with the present invention where to place fill shapes in the chip design in order to increase a density value in each section of the grid to that of a target density value.

Although it may not always be possible to achieve the target pattern density in each grid section due to the nature of the shapes on the level in question, or to interacting shapes on other levels, the present method provides a best fit approximation to the desired pattern density consistent with a set of layout rules for the level being patterned.

The present invention further provides an apparatus for implementing the method as set forth above.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
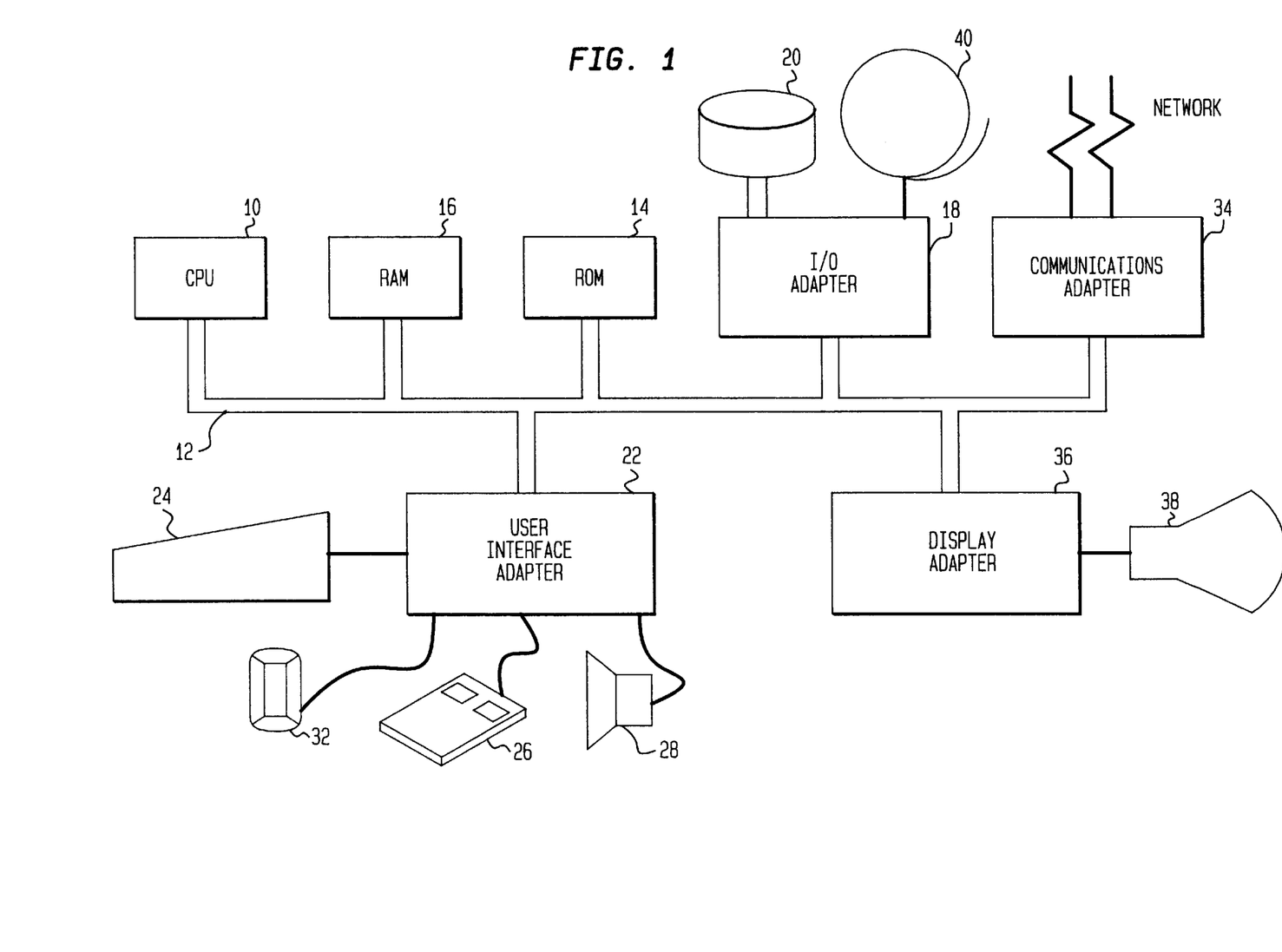
FIG. 1 illustrates an apparatus for implementing the variable density fill shape generation method according to the present invention.

The invention may be implemented on a variety of hardware platforms, including personal computers, workstations, minicomputers, and mainframe computers. Many of the steps of the method according to the present invention may be advantageously implemented on parallel processors of various types. Referring now to FIG. 1, a typical configuration of a computer information handling system that may be used to practice the novel method of the present invention will be described. The computer system of FIG. 1 has at least one central processing unit (CPU) 10. CPU 10 is interconnected via system bus 12 to random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26 having button 17, speaker 28, microphone 32, and/or other user interface devices such as a touch screen device (not shown) to bus 12, communication adapter 34 for connecting the information handling system to a data processing network, and display adapter 36 for connecting bus 12 to display device 38.

Figure 2:
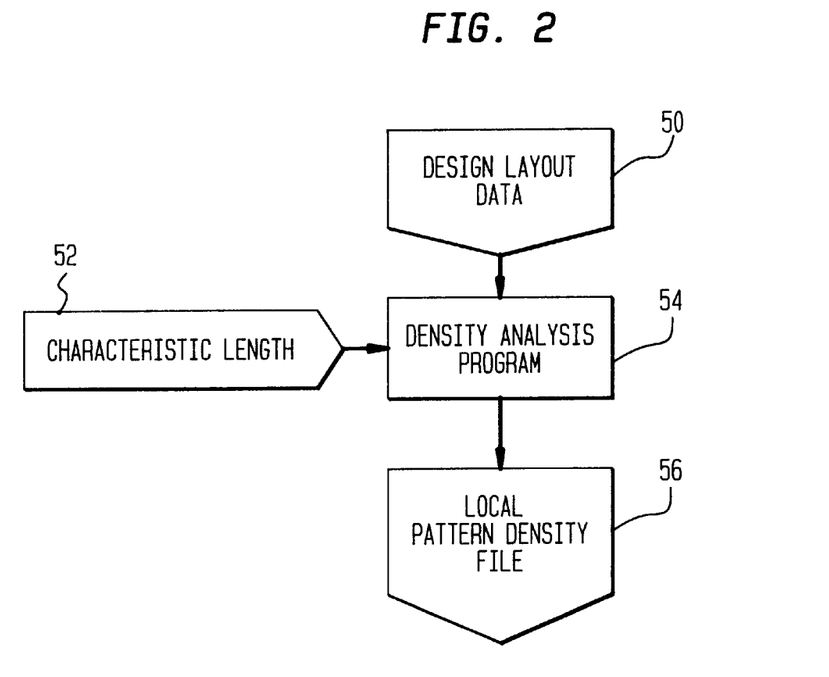
FIG. 2 is a flow diagram illustrating the steps used to generate a local pattern density file in accordance with the present invention.

Referring now to FIG. 2, a method used to generate a local pattern density file will now be described. The chip design layout data 50 and the characteristic length of the process 52 are input to a density analysis program 54. This program produces local pattern density file 56.

Density analysis program 54 begins by imposing a grid on the design pattern of the fabrication level being analyzed (e.g. a wiring level). The invention will be described by way of an example that corresponds to the addition of fill shapes corresponding to the polysilicon features of a semiconductor circuit, but it will be understood by those skilled in the art that the procedure described can be modified to add fill shapes on other material layers.

Figure 3:
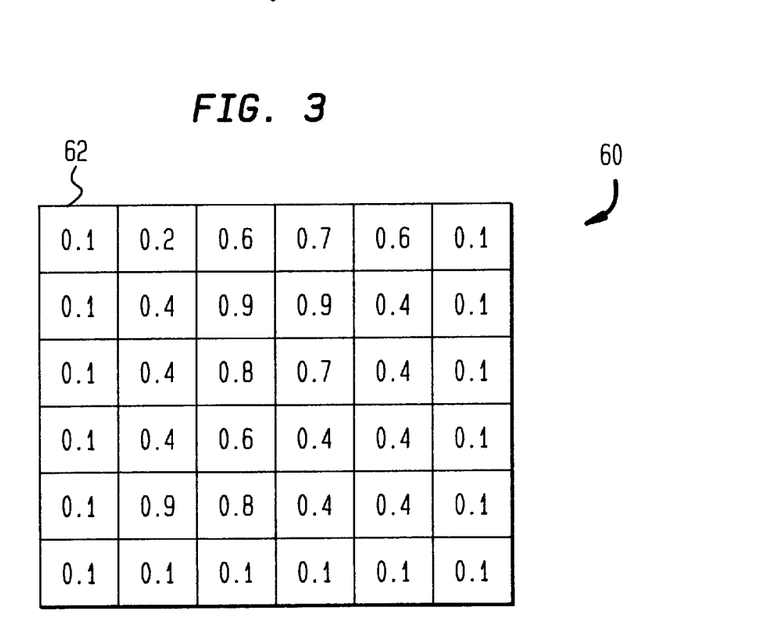
FIG. 3 is a grid of density values for an IC chip according to the present invention.

As is well known in the art, each wiring level of an IC chip is defined by design data. This design data is typically used to generate the patterned masks used during photolithographic processing of the wafer from which the IC chips thereof are fabricated. According to the steps of the present invention, automated computer techniques are used to define a grid over the design pattern of a wiring level, and within each section of the grid, a pattern density value is determined based upon the design pattern of the wiring level within the grid section. For example, section 62 of sample grid 60 as depicted in FIG. 3 contains a pattern density value of 10% polysilicon which corresponds to a pattern density value of 0.1. The pattern density values for the other sections of the grid are similarly determined. After being determined, these pattern density values are stored in local pattern density file 56. The individual programming steps needed to determine and store the pattern density values for a fabrication level of an IC chip will be apparent to one of ordinary skill in the art.

Once the pattern density for each grid section is determined, local pattern density file 56 is used as an input to a program which determines, by comparison with a user-specified pattern density target, whether the pattern in a particular grid section needs to be filled. A flow diagram depicting the method of this program is illustrated in FIG. 4.

Figure 4:
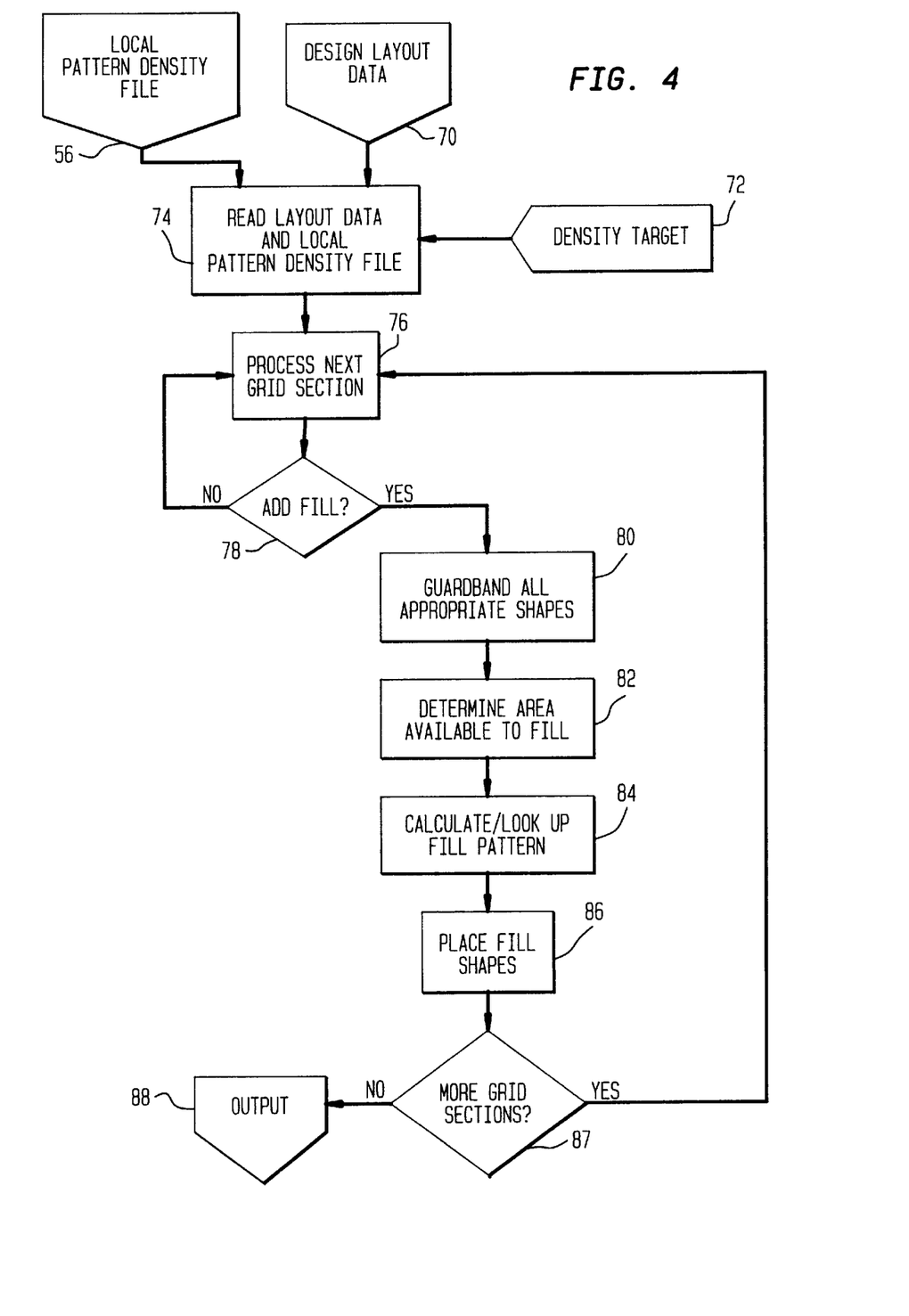
FIG. 4 is a flow chart illustrating the method used to take a physical design represented in a computer data file and generate a modified version of the design according to the present invention.

As shown in FIG. 4, the local pattern density file 56 is input to the program, along with design layout data 70. A user also specifies a density target 72 as an additional input. The program uses layout data 70 and local pattern density file 56 (step 74) to process each grid section (step 76). The program determines if a particular grid section needs to be filled with dummy fill shapes (step 78). If a particular grid section already meets or exceeds density target 72, the program proceeds to the next grid section (step 76).

If a particular grid section does not meet density target 72, the program proceeds to generate and place fill shapes in the grid section. The first step (step 80) is to guardband all appropriate shapes in the grid section. Guardbanding occurs as discussed in the following. In generating fill shapes for the polysilicon level (i.e. the set of shapes that pattern the polysilicon lines on a chip), we want to put fill shapes in the spaces between the polysilicon shapes (i.e. that the designer "drew") of the particular polysilicon design layout. To avoid violating process and electrical ground rules, an "area-to-fill" is set back (i.e. spaced apart) from the drawn polysilicon shapes. In addition, to satisfy other ground rules, the area-to-fill is set back from shapes on other levels (e.g. diffusion) and other areas as specified by the designer (e.g. test structures) should be avoided. It is convenient to define the area-not-to-fill as the union of the shapes on the polysilicon and diffusion levels, for example, each expanded by the appropriate set-back amount.

Next, the program determines the area-to-fill (step 82). The area-to-fill is computed as the complement of the area-not-to-fill previously computed in step 80. For further details regarding guardbanding and generating an area-to-fill, see "Efficient Generation Of Fill Shapes For Chips And Packages" by Chesebro, Kim, Lavin, and Maynard, application Ser. No. 08/445,447 filed May 19, 1995, and incorporated herein in its entirety.

The next step is to calculate a fill fraction for the grid section. The calculated fill fraction is used as an index into a table of fill patterns (step 84). Further details regarding this calculation and look up step are described below with reference to FIGS. 5 and 6. Finally, the fill shapes are placed in the grid section (step 86). If there are more grid sections to process (step 87), the program returns to step 76 and processes the next grid section. If there are no more grid sections to process (step 87), the program saves a modified design layout file as output 88, wherein the modified design layout file contains the original design layout plus added dummy fill shapes.

Figure 5:
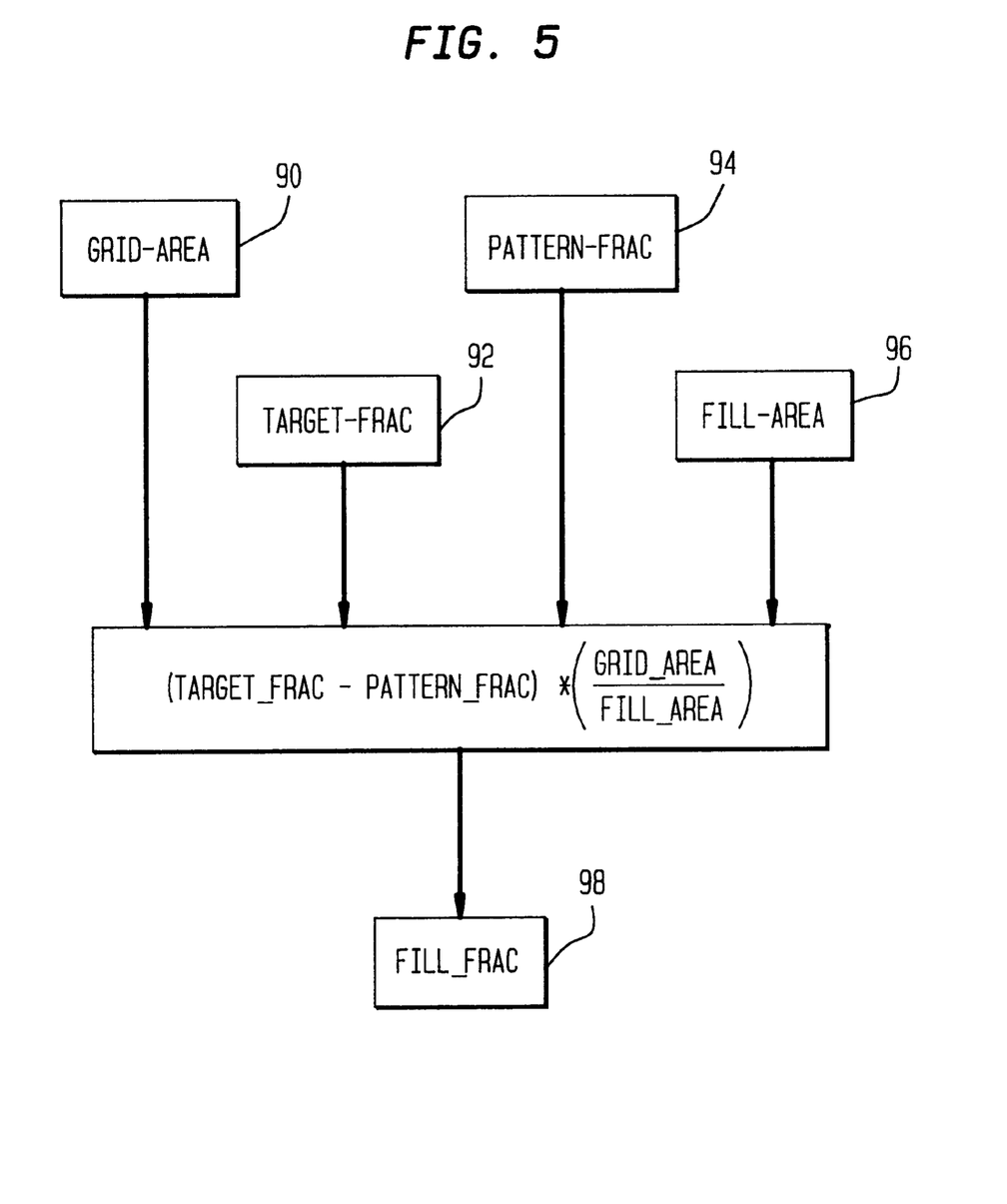
FIG. 5 is a detailed flow chart illustrating the method used to calculate an appropriate fill pattern according to the present invention.

Referring now to FIG. 5, the method used to calculate an appropriate fill pattern (step 84 in FIG. 4) is shown in detail. Four input variables are used in the calculation of FIG. 5. Grid_Area 90 is defined to be the area of one grid section. Target_Frac 92 is defined to be the desired pattern density of a grid section after filling. The value of Target_Frac 92 is obtained from input variable density target 72 as shown in FIG. 4. Pattern_Frac 94 is defined to be the pattern density of the grid section before filling, and is obtained from local pattern density file 56 as shown in FIG. 4. Fill-Area 96 is defined to be the total fillable area in the grid section. These four input variables are then used to calculate an output variable referred to as Fill_Frac 98. Fill_Frac 98 is the pattern density for the fill pattern, which is used to select the specific fill pattern. As shown in FIG. 5, Fill_Frac is 98 calculated by subtracting Pattern_Frac 94 from Target_Frac 92 and then multiplying this result by the ratio of Grid_Area 90 to Fill_Area 96.

Figure 6:
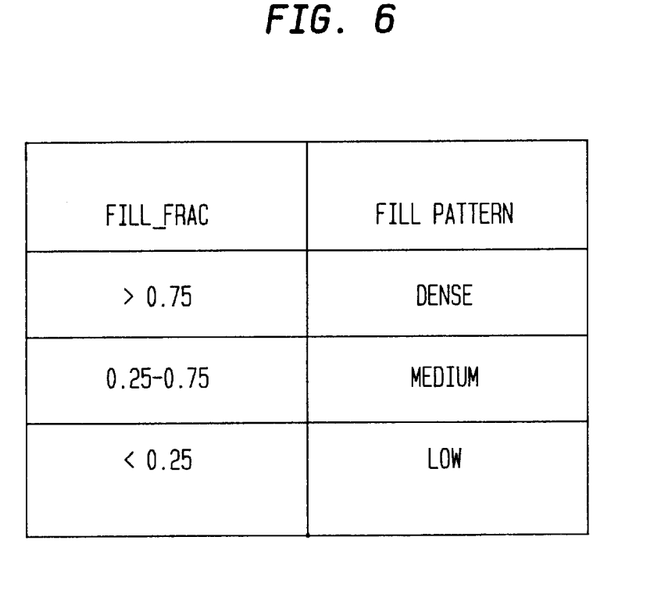
FIG. 6 is table containing fill fractions and associated fill patterns according to the present invention.
Figure 7:
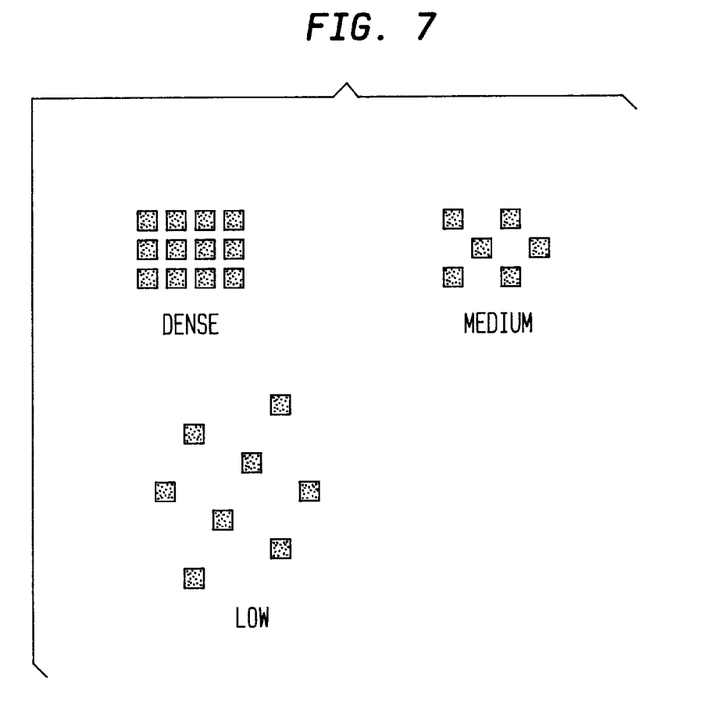
FIG. 7 illustrates fill patterns according to the present invention.

Fill_Frac 98 is used as an index into a look up table, as shown in FIG. 6. The value of Fill_Frac 98 determines which fill pattern is chosen. For example, depending on the value of Fill_Frac, one of three fill patterns—dense, medium, or low—may be chosen. A fill pattern is added to a grid section by breaking the grid section into grid squares with dimensions on the order of the desired fill shape. FIG. 7 illustrates typical dense, medium, and low fill patterns. In a dense fill, a fill shape 110 is added to every grid square 112 of a grid section 114 with minimum acceptable spacing between fill shapes 110. In a medium density fill, a fill shape 110 is added to every other grid square 112 of a grid section 114, with spacing greater than or equal to the minimum acceptable spacing between fill shape 110 corners. In a low density fill, the fill shapes 110 are staggered in a pattern as shown. The pattern may vary, and can be fine tuned by adjusting the size of the fill shapes 110, so long as the space between fill shapes 110 is greater than or equal to the minimum acceptable spacing between fill shapes 110. The fill patterns shown in FIG. 7 are examples depicted for illustrative purposes. The actual shape and spacing of the dummy fill shapes may vary.

The method and apparatus of the present invention accommodates a wide range of within-chip pattern density variations and provides a tight pattern density control within a chip and from chip to chip. Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 14 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method of controlling a fabrication level in a fabrication process for producing an integrated circuit chip having an overall target density value, the fabrication level proceeding according to a design pattern, said method comprising the steps of:

imposing a grid over the design pattern, the grid having a plurality of grid sections, each grid section having a portion of the design pattern contained therein;

establishing an actual pattern density value for each grid section based upon a portion of the design pattern contained therein; and generating one or more dummy fill shapes in each grid section based upon the actual pattern density value in each grid section in order to obtain a resultant density value in each section on the order of the overall target density value.

2. A method according to claim 1 wherein said step of establishing an actual pattern density value for each grid section comprises the steps of:

determining the percentage area of each grid section which is covered with designed shapes; and assigning an actual pattern density value to each grid section based on the percentage area of each grid section which is covered with the designed shapes.

3. A method according to claim 1, wherein said step of generating a plurality of dummy fill shapes comprises the steps of:

determining an available fill area for each grid section;

calculating a fill pattern for each grid section; and placing fill shapes in accordance with the calculated fill pattern in each grid section.

4. A method according to claim 3, wherein said step of determining the available fill area for each grid section comprises the steps of:

for each of one or more levels of a grid section, generating an area-not-to-fill, wherein the area-not-to-fill comprises the area of the grid section containing designed shapes and guardbands around the designed shapes;

calculating an areas-not-to-fill as a union of generated area-not-to-fill for all levels of the grid section; and calculating the available fill area by complementing the areas-not-to-fill.

5. A method according to claim 3, wherein said step of calculating a fill pattern for each grid section comprises the steps of:

calculating a fill ratio by dividing the total area of a grid section by the available fill area of the grid section;

calculating a difference between the actual pattern density value of the grid section and the overall target density value;

calculating a fill fraction by multiplying the fill ratio by the difference; and using the fill fraction to access a fill table, wherein the fill table contains a corresponding fill pattern for each possible fill fraction.

6. A method according to claim 2, wherein said step of generating a plurality of dummy fill shapes comprises the steps of:

determining an available fill area for each grid section;

calculating a fill pattern for each grid section; and placing fill shapes in accordance with the calculated fill pattern in each grid section.

7. A method according to claim 6, wherein said step of determining the available fill area for each grid section comprises the steps of:

for each of one or more levels of a grid section, generating an area-not-to-fill, wherein the area-not-to-fill comprises the area of the grid section containing designed shapes and guardbands around the designed shapes;

calculating an areas-not-to-fill as a union of generated area-not-to-fill for all levels of the grid section; and calculating the available fill area by complementing the areas-not-to-fill.

8. A method according to claim 6, wherein said step of calculating a fill pattern for each grid section comprises the steps of:

calculating a fill ratio by dividing the total area of a grid section by the available fill area of the grid section;

calculating the difference between the actual pattern density value of a grid section and the overall target density value;

calculating a fill fraction by multiplying the fill ratio by the difference; and using the fill fraction to access a fill table, wherein said fill table contains a corresponding fill pattern for each possible fill fraction.

9. A method according to claim 4, wherein said step of calculating a fill pattern for each grid section comprises the steps of:

calculating a fill ratio by dividing the total area of a grid section by the available fill area of the grid section;

calculating a difference between the actual pattern density value of a grid section and the overall target density value;

calculating a fill fraction by multiplying the fill ratio by the difference; and using the fill fraction to access a fill table, wherein the fill table contains a corresponding fill pattern for each possible fill fraction.

10. A system for controlling the fabrication of a level in a fabrication process for producing an integrated circuit chip having an overall target density value, the fabrication level proceeding according to a design pattern, said system comprising:

means for imposing a grid over the design pattern, the grid having a plurality of grid sections, each grid section having a portion of the design pattern contained therein;

means for establishing an actual pattern density value for each grid section based upon a portion of the design pattern contained therein; and means for generating one or more dummy fill shapes in each grid section based upon the actual pattern density value in each grid section in order to obtain a resultant density value in each section on the order of the overall target density value.

11. A system according to claim 10 wherein said means for establishing an actual pattern density value for each grid section comprises:

means for determining the percentage area of each grid section which is covered with designed shapes; and means for assigning an actual pattern density value to each grid section based on the percentage area of each grid section which is covered with the designed shapes.

12. A system according to claim 10, wherein said means for generating a plurality of dummy fill shapes comprises:

means for determining an available fill area for each grid section;

means for calculating a fill pattern for each grid section; and means for placing fill shapes in accordance with the calculated fill pattern in each grid section.

13. A system according to claim 12, wherein said means for determining the available fill area for each grid section comprises:

for each of one or more levels of a grid section, means for generating an area-not-to-fill, wherein the area-not-to-fill comprises the area of the grid section containing designed shapes and guardbands around the designed shapes;

means for calculating an areas-not-to-fill as a union of generated area-not-to-fill for all levels of the grid section; and means for calculating the available fill area by complementing the areas-not-to-fill.

14. A system according to claim 12, wherein said means for calculating a fill pattern for each grid section comprises:

means for calculating a fill ratio by dividing the total area of a grid section by the available fill area of the grid section;

means for calculating a difference between the actual pattern density value of the grid section and the overall target density value;

means for calculating a fill fraction by multiplying the fill ratio by the difference; and means for using the fill fraction to access a fill table, wherein the fill table contains a corresponding fill pattern for each possible fill fraction.

15. A system according to claim 11, wherein said means for generating a plurality of dummy fill shapes comprises:

means for determining an available fill area for each grid section;

means for calculating a fill pattern for each grid section; and means for placing fill shapes in accordance with the calculated fill pattern in each grid section.

16. A system according to claim 15, wherein said means for determining the available fill area for each grid section comprises:

for each of one or more levels of a grid section, means for generating an area-not-to-fill, wherein the area-not-to-fill comprises the area of the grid section containing designed shapes and guardbands around the designed shapes;

means for calculating an areas-not-to-fill as a union of generated area-not-to-fill for all levels of the grid section; and means for calculating the available fill area by complementing the areas-not-to-fill.

17. A system according to claim 15, wherein said means for calculating a fill pattern for each grid section comprises:

means for calculating a fill ratio by dividing the total area of a grid section by the available fill area of the grid section;

means for calculating the difference between the actual pattern density value of a grid section and the overall target density value;

means for calculating a fill fraction by multiplying the fill ratio by the difference; and means for using the fill fraction to access a fill table, wherein said fill table contains a corresponding fill pattern for each possible fill fraction.

18. A system according to claim 13, wherein said means for calculating a fill pattern for each grid section comprises:
- means for calculating a fill ratio by dividing the total area of a grid section by the available fill area of the grid section;
- means for calculating a difference between the actual pattern density value of a grid section and the overall target density value;
- means for calculating a fill fraction by multiplying the fill ratio by the difference; and
- means for using the fill fraction to access a fill table, wherein the fill table contains a corresponding fill pattern for each possible fill fraction.

19. A computer-readable medium for controlling the fabrication of a level in a fabrication process for producing an integrated circuit chip having an overall target density value, the fabrication level proceeding according to a design pattern, said computer-readable medium comprising:
- means for imposing a grid over the design pattern, the grid having a plurality of grid sections, each grid section having a portion of the design pattern contained therein;
- means for establishing an actual pattern density value for each grid section based upon a portion of the design pattern contained therein; and
- means for generating one or more dummy fill shapes in each grid section based upon the actual pattern density value in each grid section in order to obtain a resultant density value in each section on the order of the overall target density value.

20. A computer-readable medium according to claim 19 wherein said means for establishing an actual pattern density value for each grid section comprises:
- means for determining the percentage area of each grid section which is covered with designed shapes; and
- means for assigning an actual pattern density value to each grid section based on the percentage area of each grid section which is covered with the designed shapes.

21. A computer-readable medium according to claim 19, wherein said means for generating a plurality of dummy fill shapes comprises:
- means for determining an available fill area for each grid section;
- means for calculating a fill pattern for each grid section; and
- means for placing fill shapes in accordance with the calculated fill pattern in each grid section.

22. A computer-readable medium according to claim 21, wherein said means for determining the available fill area for each grid section comprises:
- for each of one or more levels of a grid section, means for generating an area-not-to-fill, wherein the area-not-to-fill comprises the area of the grid section containing designed shapes and guardbands around the designed shapes;
- means for calculating an areas-not-to-fill as a union of generated area-not-to-fill for all levels of the grid section; and
- means for calculating the available fill area by complementing the areas-not-to-fill.

23. A computer-readable medium according to claim 21, wherein said means for calculating a fill pattern for each grid section comprises:
- means for calculating a fill ratio by dividing the total area of a grid section by the available fill area of the grid section;
- means for calculating a difference between the actual pattern density value of the grid section and the overall target density value;
- means for calculating a fill fraction by multiplying the fill ratio by the difference; and
- means for using the fill fraction to access a fill table, wherein the fill table contains a corresponding fill pattern for each possible fill fraction.

24. A computer-readable medium according to claim 20, wherein said means for generating a plurality of dummy fill shapes comprises:
- means for determining an available fill area for each grid section;
- means for calculating a fill pattern for each grid section; and
- means for placing fill shapes in accordance with the calculated fill pattern in each grid section.

25. A computer-readable medium according to claim 24, wherein said means for determining the available fill area for each grid section comprises:
- for each of one or more levels of a grid section, means for generating an area-not-to-fill, wherein the area-not-to-fill comprises the area of the grid section containing designed shapes and guardbands around the designed shapes;
- means for calculating an areas-not-to-fill as a union of generated area-not-to-fill for all levels of the grid section; and
- means for calculating the available fill area by complementing the areas-not-to-fill.

26. A computer-readable medium according to claim 24, wherein said means for calculating a fill pattern for each grid section comprises:
- means for calculating a fill ratio by dividing the total area of a grid section by the available fill area of the grid section;
- means for calculating the difference between the actual pattern density value of a grid section and the overall target density value;
- means for calculating a fill fraction by multiplying the fill ratio by the difference; and
- means for using the fill fraction to access a fill table, wherein said fill table contains a corresponding fill pattern for each possible fill fraction.

27. A computer-readable medium according to claim 22, wherein said means for calculating a fill pattern for each grid section comprises:
- means for calculating a fill ratio by dividing the total area of a grid section by the available fill area of the grid section;
- means for calculating a difference between the actual pattern density value of a grid section and the overall target density value;
- means for calculating a fill fraction by multiplying the fill ratio by the difference; and
- means for using the fill fraction to access a fill table, wherein the fill table contains a corresponding fill pattern for each possible fill fraction.

* * * * *